(12) United States Patent
Liu et al.

(10) Patent No.: US 9,473,890 B1
(45) Date of Patent: Oct. 18, 2016

(54) ENHANCED SYSTEM AND METHOD FOR MOBILE DEVICE-BASED GEO-FENCING SOLUTIONS

(71) Applicant: Motorola Mobility LLC, Chicago, IL (US)

(72) Inventors: Feng Liu, Sunnyvale, CA (US); Riya B Nair, Fremont, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/869,211

(22) Filed: Sep. 29, 2015

(51) Int. Cl.
    *H04W 4/02*     (2009.01)
    *H04W 52/02*     (2009.01)
    *G01S 19/42*     (2010.01)

(52) U.S. Cl.
    CPC .............. *H04W 4/021* (2013.01); *G01S 19/42* (2013.01); *H04W 4/028* (2013.01); *H04W 52/0209* (2013.01)

(58) Field of Classification Search
    CPC ..................... G06Q 30/0261; G06Q 30/0205; G06F 17/30041; G06F 17/30241; G06F 17/3087; H04W 4/02; H04W 4/021; H04W 4/028; H04W 4/206
    See application file for complete search history.

(56) References Cited

U.S. PATENT DOCUMENTS

| | | | | |
|---|---|---|---|---|
| 2008/0143604 A1* | 6/2008 | Mock | .................... | G01S 5/0205 342/450 |
| 2011/0059749 A1* | 3/2011 | Hefner | .................... | H04W 4/02 455/456.1 |
| 2013/0079028 A1* | 3/2013 | Klein | .................... | G08G 1/207 455/456.1 |
| 2013/0225196 A1* | 8/2013 | James | .................... | H04W 4/028 455/456.1 |
| 2013/0275221 A1* | 10/2013 | Zeto, III | ............ | G06Q 30/0261 705/14.58 |
| 2014/0057648 A1 | 2/2014 | Lyman et al. | | |
| 2014/0278860 A1* | 9/2014 | Lee | .................... | G06Q 30/0214 705/14.16 |
| 2014/0337123 A1 | 11/2014 | Nuernberg et al. | | |
| 2015/0310729 A1* | 10/2015 | Lampert | .............. | G08B 25/016 340/539.11 |
| 2016/0094944 A1* | 3/2016 | Kong | .................... | H04W 4/022 455/456.1 |

OTHER PUBLICATIONS

Wikipedia, "DBSCAN", https://en.wikipedia.org/wiki/DBSCAN, Aug. 6, 2015, 8 pages.

\* cited by examiner

*Primary Examiner* — Nizar Sivji

(57) ABSTRACT

A method, wireless device and computer program product provides geo-fence based services in a wireless communications network. The wireless device (i) determines a current location; (ii) retrieves first settings of a first geo-fence; (iii) implements a geo-fencing policy in response to determining that the current location is within the first geo-fence; and (iv) in response to determining that the current location is not within the first geo-fence: (a) accesses data associated with one of an activity at past locations inside and outside of the first geo-fence; (b) associates with the first geo-fence at least one past location that is outside of the first geo-fence; (c) expands the first settings of the first geo-fence to second settings to include the at least one past location; and (d) implements the geo-fencing policy in response to determining that the current location is within the first geo-fence based on the second settings.

14 Claims, 7 Drawing Sheets

| Activity | Location | Time window |
|---|---|---|
| User interaction with a turn-by-turn navigation application | Coordinates(x1,y1) | Weekend, Daytime |
| Wireless communication with employer's network by office productivity application | Coordinates(x2,y2) | Weekday, Daytime |
| Cellular transceiver detecting no/weak Quality of Service | Coordinates(x3,y3) | Weekday, Night |
| Playing audio on podcast application | Coordinates(x4,y4) | Weekday, rush hour |
| ... | Coordinates(xn,yn) | ... |

*FIG. 7*

ENHANCED SYSTEM AND METHOD FOR MOBILE DEVICE-BASED GEO-FENCING SOLUTIONS

BACKGROUND

1. Technical Field

The present disclosure generally relates to location and data services on a portable wireless device, and more particularly to accurately enforcing geo-fencing policy for a portable wireless device in a communication system.

2. Description of the Related Art

Personal electronic devices such as smart phones are becoming ubiquitous, providing a constant source of entertainment, communication, navigation, and personal assistance. Some of these functions depend upon determining the location of the portable wireless device. Outside location services, such as those that involve receiving signals from Global Navigation Satellite System (GNSS) satellites, can provide or assist with determining such location and motion information, although with an increase in power consumption. Certain multimode portable wireless devices can access small coverage area devices or systems, such as WiFi devices and cellular femtocells, when indoors and can access wireless wide area networks (WWAN), such as cellular radio access networks (RAN), when outdoors. Configuring the portable wireless device for efficient power consumption, data service, and location service functionality can thus depend on accurately determining where the device is in respect to a geographic location.

These and other considerations have given rise to defining a geo-fence to determine how a mobile device operates, depending upon a determined location. A geo-fence is a virtual perimeter for a real-world geographic area. A geofence could be dynamically generated, as in a radius around a store or point location. Or a geo-fence can be a predefined set of boundaries, like school attendance zones or neighborhood boundaries. When a location-aware portable wireless device of a location-based service (LBS) user enters or exits a geo-fence, the device receives a notification. This notification might contain information about the location of the device.

While geo-fencing can provide specific advantages for users of mobile devices, often the mobile device is unable to accurately determine whether its location is within or outside of the geo-fence. GNSS services may be unavailable or consume too much battery power for use. Wireless or cellular services can provide approximate location data that can inaccurately indicate being inside or outside of the geo-fence. In addition, the boundaries of a geo-fence may be inaccurately defined in association to the intended activities for inside and outside of the geo-fence.

BRIEF DESCRIPTION OF THE DRAWINGS

The description of the illustrative embodiments is to be read in conjunction with the accompanying drawings, wherein:

FIG. 7 illustrates an example data structure of a table of activities of the wireless device that are linked to locations and contextual circumstances, according to one or more embodiments.

DETAILED DESCRIPTION

Figure 1:
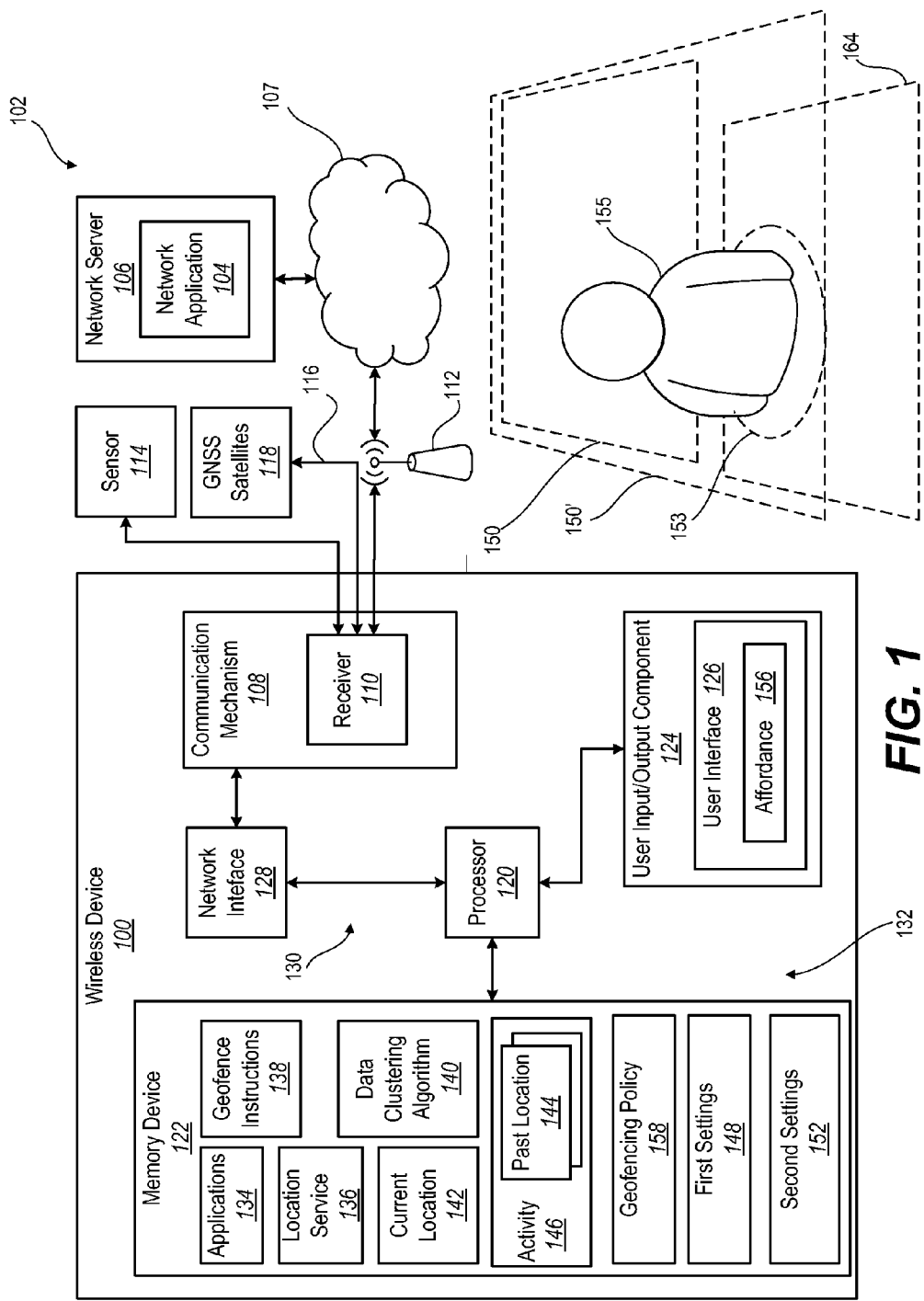
FIG. 1 illustrates a block diagram representation of an example wireless device, according to one or more embodiments.

The present innovation provides a method, wireless device, and computer program product for dynamically defining and implementing a geo-fencing policy based on activities of a portable communication device. The method includes a processor determining a current location of a wireless device. The method includes the processor retrieving, from a memory, first settings of a first geo-fence. The method includes the processor implementing a geo-fencing policy in response to determining, based on the first settings, that the current location is within the first geo-fence. The method includes the processor in response to determining that the current location is not within the first geo-fence: (a) accessing, by the processor, data associated with an activity of the wireless device at past locations inside and outside of the first geo-fence; (b) associating, by the processor, with the first geo-fence at least one past location that is outside of the first geo-fence, based on the activity; (c) expanding, by the processor, the first settings of the first geo-fence to provide second settings that include the at least one past location, such that the geo-fencing policy extends to an expanded first geo-fence; and (d) implementing, by the processor, the geo-fencing policy in response to determining that the current location is within the expanded first geo-fence.

The wireless device includes a receiver that detects information corresponding to a current location of the device. The wireless device includes a processor in communication with the receiver. The wireless devices includes at least one memory device that contains an application and that is configured to store a set of instructions that are executed by the processor. The processor determines a current location of a wireless device, based in part on the information detected by the receiver. The processor retrieves, from a memory, first settings of a first geo-fence. The processor implements a geo-fencing policy in response to determining that the current location is within the first geo-fence based on the first settings. In response to the processor determining, based on the first settings, that the current location is not within the first geo-fence: (a) the processor accesses data associated with an activity of the wireless device at past locations inside and outside of the first geo-fence from the memory device; (b) the processor associates at least one past location that is outside of the first geo-fence with the first geo-fence based on the activity; (c) the processor expands the first settings of the first geo-fence to provide second settings that include the at least one past location such that the geo-fencing policy extends to an expanded first geo-fence; and (d) the processor implements the geo-fencing policy in response to determining that the current location is within the expanded first geo-fence.

The computer program product includes a computer-readable storage device having stored thereon program code that, when executed, configures a device having a processor to perform executable operations that include: (i) determining a current location of a wireless device; (ii) retrieving, from a memory, first settings of a first geo-fence; (iii) implementing a geo-fencing policy in response to determining based on the first settings, that the current location is within the first geo-fence; and (iv) in response to determining that the current location is not within the first geo-fence: (a) accessing data associated with an activity of the wireless device at past locations inside and outside of the first geo-fence; (b) associating with the first geo-fence at least one past location that is outside of the first geo-fence based on the activity; (c) expanding the first settings of the first geo-fence to provide second settings that include the at least one past location such that the geo-fencing policy extends to an expanded first geo-fence; and (d) implementing the geo-fencing policy in response to determining that the current location is within the expanded first geo-fence.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example portable wireless device 100 within which several of the features of the disclosure can be implemented. The portable wireless device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, portable wireless device 100 can be one of, and also be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a hand-held device having wireless connection capability, a computing device, or other processing devices connected to a wireless modem. These various devices all provide and/or include the necessary hardware and software to support the various wireless or wired communication functions as part of a communication system 102.

For clarity, the present innovation is described herein as occurring on the portable wireless device 100. In one or more embodiments, aspects of the present innovation can be distributed or wholly performed by a remote entity, such as a network application 104 executed on a network server 106 that communicates with the portable wireless device 100 over a network 107 supported by the communication system 102. According to the general illustration, the portable wireless device 100 is a processing device having at least one wireless communication mechanism 108 including a receiver 110 that enables communicating with an over-the-air (OTA) network node 112 that is part of the communication system 102. The receiver 110 or another sensor 114 can provide current location data. In an exemplary embodiment, the receiver 110 can provide relative location data with regard to one or more OTA network nodes 112 or provide absolute geographic location data by receiving Global Navigation Satellite System (GNSS) signals 116 from GNSS satellites 118. The sensor 114 can also provide relative or absolute location data, such as by sensing signals unique to a particular location, supporting inertial or dead reckoning navigation, etc. The sensor 114 can be on-device or off-device. For example, the OTA network node 112 can include azimuth and power sensing capabilities that enable approximate location data for the portable wireless device 100.

For internal processing, the example portable wireless device 100 includes a processor 120, a memory device 122, a user input/output component 124 that supports a user interface 126, and a network interface 128 that supports communication protocols for communicating over the wireless communication mechanism 108. An interconnection 130 such as one or more communication buses provides electronic interconnection between components 132 of the portable wireless device 100. The memory device 122 can contain applications 134 that are executed by the processor 120, a location service 136 that responds to the receiver 110 and/or sensor 114 to obtain location data, and a set of instructions 138 for performing geofencing functions of the present innovation. The memory device 122 can also include a data clustering algorithm 140, such as density-based spatial clustering of application with noise (DBSCAN). The memory device 122 can store current location data 142, past location data 144 associated with an activity 146 of the portable wireless device 100, first settings 148 of a first geo-fence 150, and second settings 152 of a second geo-fence 154.

The processor 120 executes the set of instructions 138 to determine the current location data 142 of the portable wireless device 100. An actual current location 153 can be different from the current location data 142 due to factors such as the degree of accuracy in sensing the actual current location 153. Alternatively, the current location data 142 can accurately indicate the actual current location 153 of the portable wireless device 100 yet be incorrectly defined as outside of first settings 148 of the first geo-fence 150. For example, creation of a geo-fence 150 can be initiated with a standard sized area and not defined with a detailed footprint. In one or more embodiments, a user 155 of the portable wireless device 100 can select an affordance 156 on the user interface 126 to establish the first geo-fence. The affordance can record the current location data 142 as a center point of geo-fence.

The geo-fence 150 is associated with a geo-fencing policy 158. An example of such a geo-fencing policy 158 includes disabling the location service 136 or a cellular capability of the wireless communication mechanism 108 to reduce power consumption when in a home or work environment. The geo-fencing policy 158 can provide other functionality such as sending a message or alert when the portable wireless device 100 enters and/or exits the geo-fence 150. However, the first geo-fence 150 can be incorrect in definition or application. For example, the first settings 148 of the first geo-fence 150 may default to physical dimensions that do not correspond to the user's intent for the first geo-fence 150.

To address these and other deficiencies, the processor 120 (executing the geo-fencing utility . . . ) can perform functions that dynamically adjust the first geo-fence 150 to correspond to past locations and activities of the portable wireless device 100. For example, the user 155 may create a second geo-fence 164 that is initially defined as being entirely outside of the first geo-fence 150. The present innovation provides in part a methodology for the portable wireless device 100 to determine that the first and second geo-fences 150, 164 are intended to overlap such that no geo-fencing policy 158 is invoked in moving between the first and second geo-fences 150, 164. Instead, second settings 166 are defined that expand the first geo-fence 150 to an expanded first geo-fence 150' to include a current location data 142 that initially was deemed outside of the first geo-fence 150.

Figure 2:
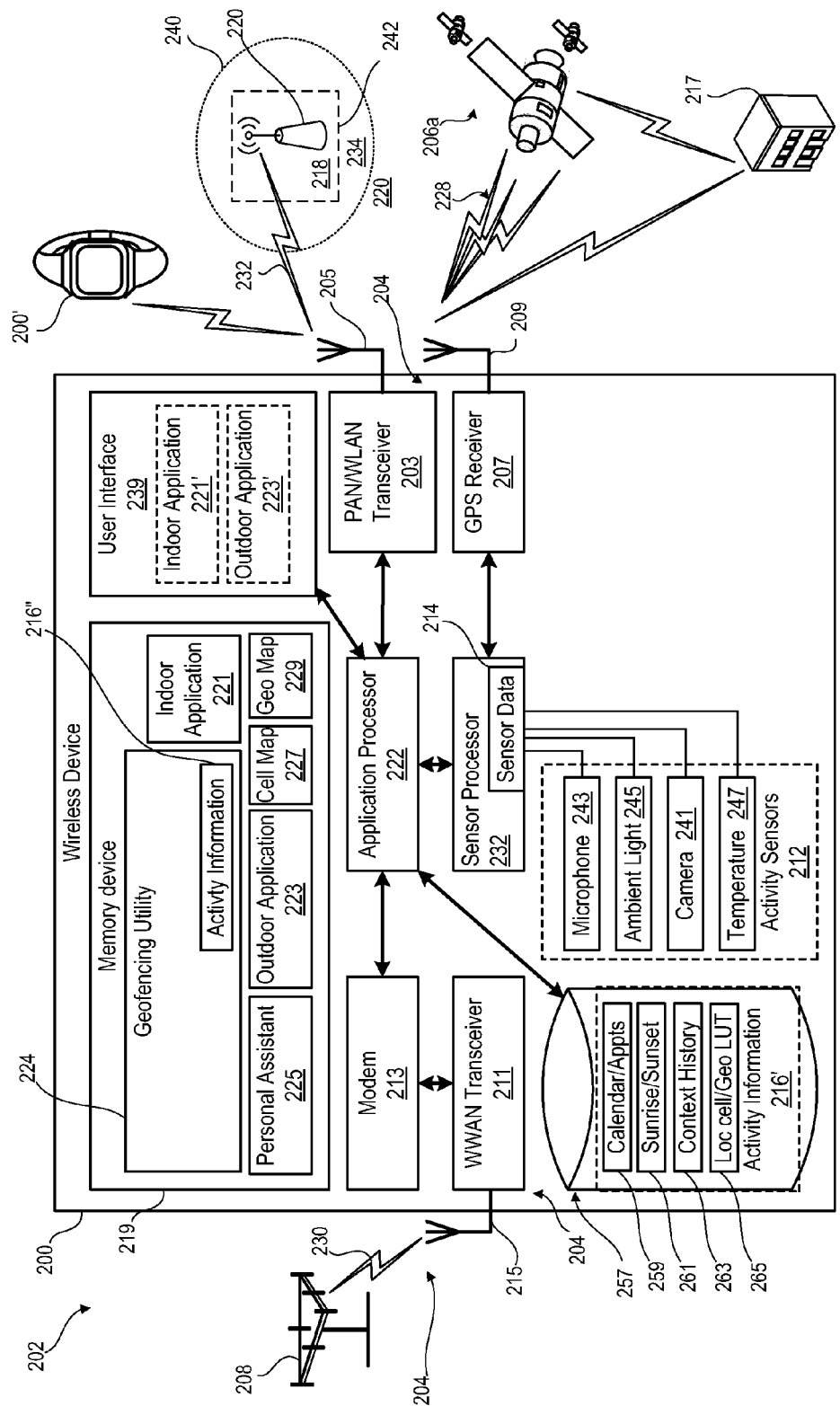
FIG. 2 illustrates a detailed block diagram representation of an example wireless device configured with various components that enable one or more described features of the disclosure, according to one or more embodiments.

In FIG. 2, there is depicted an example communication system 202 that is capable of simultaneously supporting wireless multiple-access communication for multiple wireless terminals such as portable wireless device 200. The portable wireless device 200 includes the hardware and software to support the various wireless or wired communication functions as part of a communication system 202. The portable wireless device 200 can be a unitary device or an apparatus carried by an individual or vehicle having components in wired or wireless communication, such as a depicted multifunction, networked watch 200' that performs some or all functions of communication and sensing. The portable wireless device 200 includes activity monitoring such as location sensing, user activity information, and application tracking to associate locations with geo-fences. For example, a geo-fence can be defined for when the wireless device 200 is deemed to be operating indoor in a home or work environment.

The communication mechanism 204 of the portable wireless device 200 can be a Personal Access Network (PAN) or Wireless Local Access Network (WLAN) transceiver 203 that transmits and receives over an antenna 205. Alternatively or in addition, the communication mechanism 204 can be a GPS receiver 207 that receives GPS satellite signals over a GPS antenna 209. Alternatively or in addition, the communication mechanism 204 can be a Wireless Wide Area Network (WWAN) transceiver 211 that communicates data packets encoded or decoded by a modem 213 via an antenna 215 to RAN 208. For clarity, three antennas 205, 209, 215 are depicted, each optimized for a particular communication band. Certain embodiments can switch access to an antenna for non-simultaneous communications or for selecting an appropriate antenna gain. In one or more embodiments, a particular antenna can be capable of multiple frequency band transmission and reception. In one or more embodiments, multiple antennas can be cooperatively used for purposes such as spatial diversity.

The communication mechanism 204 can communicate, for example, by using the PAN/WLAN transceiver 203 with the small coverage area device 210 that utilizes associated communication protocols. A PAN/WLAN transceiver 203 is not necessarily limited to any particular protocol, and instead may encompass any relatively short range or limited area wireless communication link. Examples of PAN protocols which may be used in the various embodiments include Bluetooth®, IEEE 802.15.4, and Zigbee® wireless communication protocols and standards. Another exemplary low power radio technology protocol is the ANT protocol, ANT+ (or ANT Plus) protocol, etc. ANT+ protocol is an interoperability function that can be added to the base ANT protocol, which is a proprietary wireless sensor network technology. In addition to these PAN protocols, wireless proximity-limited communication links may be established using other close range communication media, including for example radio frequency identification (RFID) tag and the IrDA (Infrared Data Association) protocols. Also, other close range wireless protocols and standards may be developed and may be used in the various embodiments in the same manner as described herein. Further, longer range wireless communication protocols may be used with modifications or additions to limit their effective range to the vicinity of the portable wireless device 200. In one or more embodiments, WiFi and WiMax wireless communication protocols could also be used in combination with range-limiting features. For example, the power of miniaturized sensor transmitters within multifunction networked watch 200' may be limited. Thus, either or both of the WWAN transceiver 211 and PAN/WLAN transceiver 211 can function at least during certain intervals as a PAN transceiver, although using a communication protocol typically capable of and used for a greater range. As another example, round-trip communication delay limits may be imposed such that the on-device or on-vehicle communication links can only be established if the round trip of such signals is less than a threshold that is set to reject signals sent from more than a specific distance away (e.g., 12 feet), and the threshold may be as short as two to three feet separation, in some embodiments.

Alternatively or in addition, the communication mechanism 204 can communicate by using the WWAN transceiver 211 with the small coverage area device 210, such as a cellular femtocell. To supplement conventional mobile phone network base stations (commonly referred to as macrocell base stations, NodeBs, etc.), additional small-coverage base stations may be deployed to provide more robust wireless coverage for the wireless terminals. These small-coverage base stations may be commonly referred to as access point base stations, Home NodeBs, femto access points, femtocells, etc., and may be deployed for incremental capacity growth, richer user experience, in-building coverage, or the like. Typically, such small-coverage base stations are connected to the Internet and the mobile operator's network via a broadband connection, such as a digital subscriber line (DSL) router, cable or other modem, etc. Small-coverage base stations may also provide additional or enhanced services (e.g., increased bandwidth, unlimited access, access to other devices, etc.) to one or more wireless terminals.

The techniques described herein may be used for various wireless communication networks that operate according to, but not limited to, any one or more of the OMA (Open Mobile Alliance), 3GPP (3rd Generation Partnership Project), 3GPP2 (3rd Generation Partnership Project 2), IEEE (Institute of Electrical and Electronics Engineers) 802.xx, and WiMAX Forum standards. The terms "networks" and "systems" are often used interchangeably. Such communication networks can be Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), CDMA 2000, etc. UTRA includes Wideband-CDMA (W-CDMA) and time division synchronous code division multiple access (TD-SCDMA). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from the 3GPP organization. CDMA2000 is described in documents from the 3GPP2 organization. These various radio technologies and standards are known in the art.

Location service 206 can be provided by a Global Navigation Satellite System (GNSS), such as Global Positioning System (GPS), Globalnaya navigatsionnaya sputnikovaya sistema (GLONASS), GALILEO or BeiDou Navigation Satellite System (BDS). In the example portable device 200, location service 206 is provided by GPS 206a. Alternatively or in addition, location service 206 can be provided by triangulating from one or more RANs 208. Alternatively or in addition, location service 206 can be provided by "sniffing" of small coverage area devices 210 such as one or more wireless access points, femtocells, relays, etc. The location service 206, such as GPS 206a, can be more accurate when in the outdoor space 220. However, in some instances the location service 206 can be less accurate or even unavailable when in the outdoor space 220, such as when in an urban canyon or an obstruction 217 creates a multipath error.

Referring now to the specific component makeup and the associated functionality of the presented components, portable wireless device 200 can include an application processor 222, which connects via a plurality of bus interconnects (illustrated by the bi-directional arrows) to a plurality of functional components of portable wireless device 200. The application processor 222 controls the communication, image capture, user interface, and other functions and/or operations of portable wireless device 200. These functions and/or operations thus include, but are not limited to, application data processing. A sensor processor 232 performs digital signal processing and provides signal interfaces to sensors 212. The present innovation can be implemented using hardware component equivalents such as special purpose hardware, dedicated processors, general purpose computers, microprocessor-based computers, micro-controllers, optical computers, analog computers, dedicated processors and/or dedicated hard wired logic. Application processor 222 and sensor processor 232 can include separate programmable microprocessors or can both be integrated into a single processing device, in some embodiments.

Connected to application processor 222 is memory 219, which can include volatile memory and/or non-volatile memory. Moreover, an embodiment can be implemented as a computer-readable storage device having computer readable code stored thereon for programming a computer (e.g., comprising a processor) to perform a method as described and claimed herein.

One or more executable applications can be stored within memory for execution by application processor 222. For example, memory 219 is illustrated as containing the geo-fencing utility 224. Memory 219 also can contain an indoor application 221, an outdoor application 223, a personal assistant utility 225, a cell mapping utility 227, and a geographic map utility 229. The geo-fencing utility 224 can assist the other applications and utilities in memory 219 by detecting the wireless device 200 being inside or outside of a geo-fence.

The geo-fencing utility 224 can also utilize outdoor location services such as GPS, which allows the location of portable wireless device 200 to be pin-pointed when signals from multiple GPS satellites are received by the GPS receiver 207. Two notable weak points with the use of GPS are the inability to determine a position when not receiving signals from more than one satellite (due to shielding by buildings or geographic features or improper antenna orientation) and use of more power consuming electronics. Another method of locating a portable wireless device 200, such as a mobile phone, is by using fixed cell phone towers (cell tower triangulation), provided that signals can be received by those towers. A third method of locating a portable wireless device 200 is by using a fixed array of radio frequency transceivers (integrated receivers and transmitters) distributed over a specific area to form a WLAN to relay signals wirelessly from the portable wireless device 200 to a specific point, such as to a monitoring center or a gateway to the Internet, which in turn transmits the signal to a remote monitoring center. Then, by using either time of arrival or signal strength of a portable wireless device 200 reaching a distributed transceiver, the location of the portable wireless device 200 can be determined. Whatever the outdoor location service employed, the geo-fencing utility 224 can still face an ambiguity of whether the device is indoor or outdoor or to what extent the device can or should attempt to receive outdoor location services.

The portable wireless device 200 also comprises one or more input/output devices, including a user interface device 239. For example, the geo-fencing utility 224 can effect when, or if, an indoor or outdoor application 221, 223 executes, or how the application 221 or 223 executes, which execution is depicted on user interface device 239 respectively at 221', 223'. It should be appreciated that the user interface device 239 can include one or more integral or distinct input devices, such as camera 241, microphone 243, touch screen and/or touch pad, keypad, and/or one or more integral or distinct output devices, such as display, speaker and others (not shown). Some input devices can also be used, or have a dedicated purpose, as activity sensors 212 rather than for the user interface 239. Examples of other activity sensors can be an ambient light sensor 245 and temperature sensor 247.

To reduce the ambiguity of location detection, the geo-fencing utility 224 can access activity information 216 from the at least one sensor 212 or from activity information 216' contained in a data storage device 257. Data storage device 257 can be any type of available storage device capable of storing one or more application software and data. It is further appreciated that in one or more alternate embodiments, the data storage device 257 can actually be remote storage and not an integral part of the portable wireless device 200. The geo-fencing utility 224 can also derive activity information 216" from a combination of sensor data 214 and activity information 216'. For example, the activity information 216' in the data storage device 257 can include personal information used by the personal assistant utility 225, depicted as calendar/appointment data 259. As another example, sunrise/sunset data 261 can be used with sensor data 214 from the chronometer 255 in conjunction with current location. Thereby, the geo-fencing utility 224 can determine whether it should be daylight when outdoors. Such activity information 216" can then be compared to sensor data 214 from the ambient light sensor 245. As an additional example, activity information 216' can include activity history data 263. For example, past transitions from indoor to outdoor or outdoor to indoor at a particular location can be associated with certain sensor data 214, as discussed below with regard to FIG. 3. Identifying locations for such activity history data 263 can be made with reference to a location cell data/geographic coordinate look up table (LUT) 265.

Figure 3A:
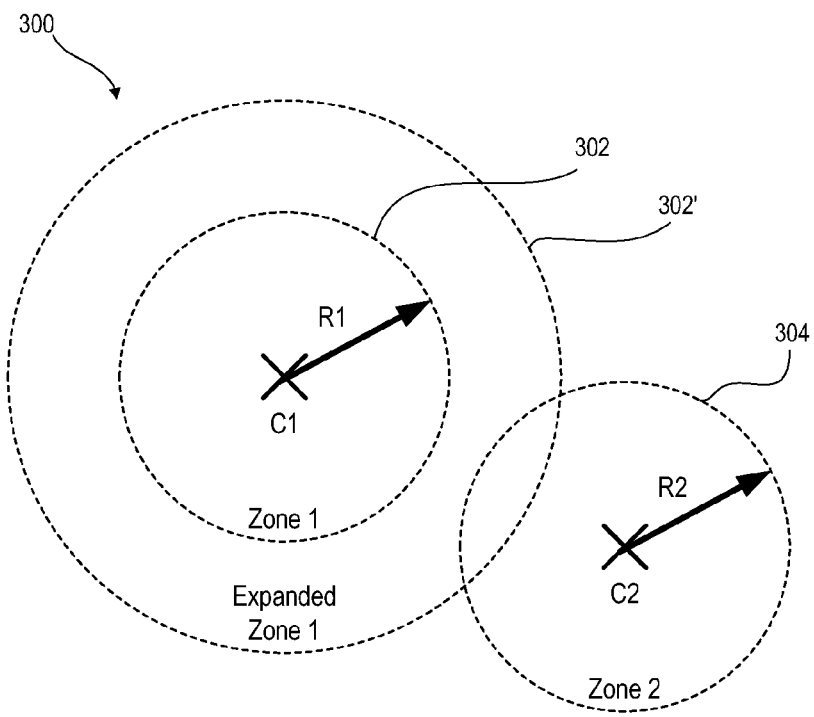
FIG. 3A illustrates a diagram of an operating space of a wireless device having defined two displaced geo-fences, according to one or more embodiments.

The present innovation can address deficiencies in certain generally-known approaches to geo-fencing policies. FIG. 3A illustrates an operating space 300 of a wireless device 100 (FIG. 1) wherein a physical address of the location of the wireless device "C1" is used to define a first virtual geo-fence ("Zone 1") 302 of radius "R1". At a subsequent time, the wireless device is inaccurately deemed to be at a location C2. A user of the wireless device can again initiate enforcement of a second virtual geo-fence ("Zone 3") 304 having a radius "R2". The two radii R1 and R2 can be the same default value. The determined distance between C1 and C2 can be more than R1+R2, thus the two geo-fences 302, 304 do not overlap. In one scenario, the user may expect for a geo-fencing policy of Zone 1 to be triggered when in Zone 2; however, the wireless device or network server will not determine the transition. Expanding the first virtual geo-fence 302 to an expanded first virtual geo-fence 302' can avoid this occurrence.

Figure 3B:
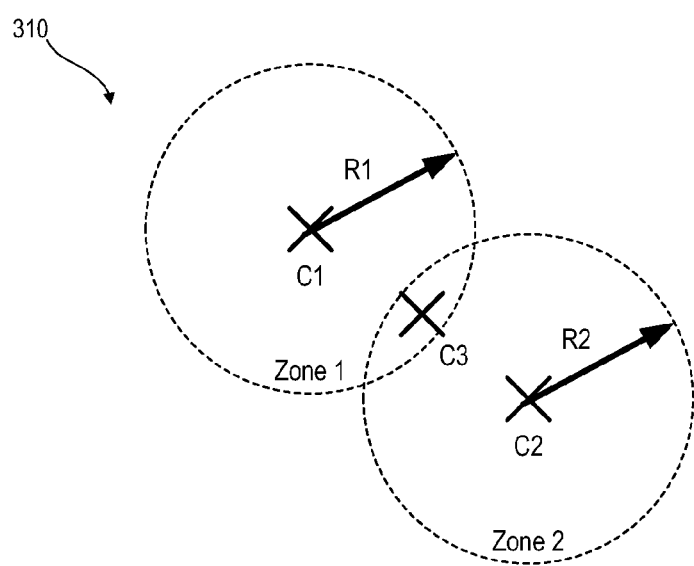
FIG. 3B illustrates a diagram of an operating space of a wireless device having defined two overlapping geo-fences, according to one or more embodiments.

FIG. 3B illustrates an operating space 310 of a wireless device 100 (FIG. 1) where a physical address of the location of the wireless device "C1" is used to define a first virtual geo-fence ("Zone 1") 312 of radius "R1". At a subsequent time, the wireless device is determined to be at a location C2. A user of the wireless device can again initiate enforcement of a second virtual geo-fence ("Zone 3") 314 having a radius "R2". The two radii R1 and R2 can be the same default value. The determined distance between C1 and C2 can be less than R1+R2, thus the two geo-fences 312, 314 overlap, even though the user may expect for different geo-fencing policies to be enforced for the respective geo-fences 312, 314. One embodiment of the present innovation can associate a location C3 in the overlapping region of the two geo-fences 312, 314 in order to sort out whether to trigger a geo-fencing policy for leaving Zone 1 or for entering Zone 2.

Figure 4:
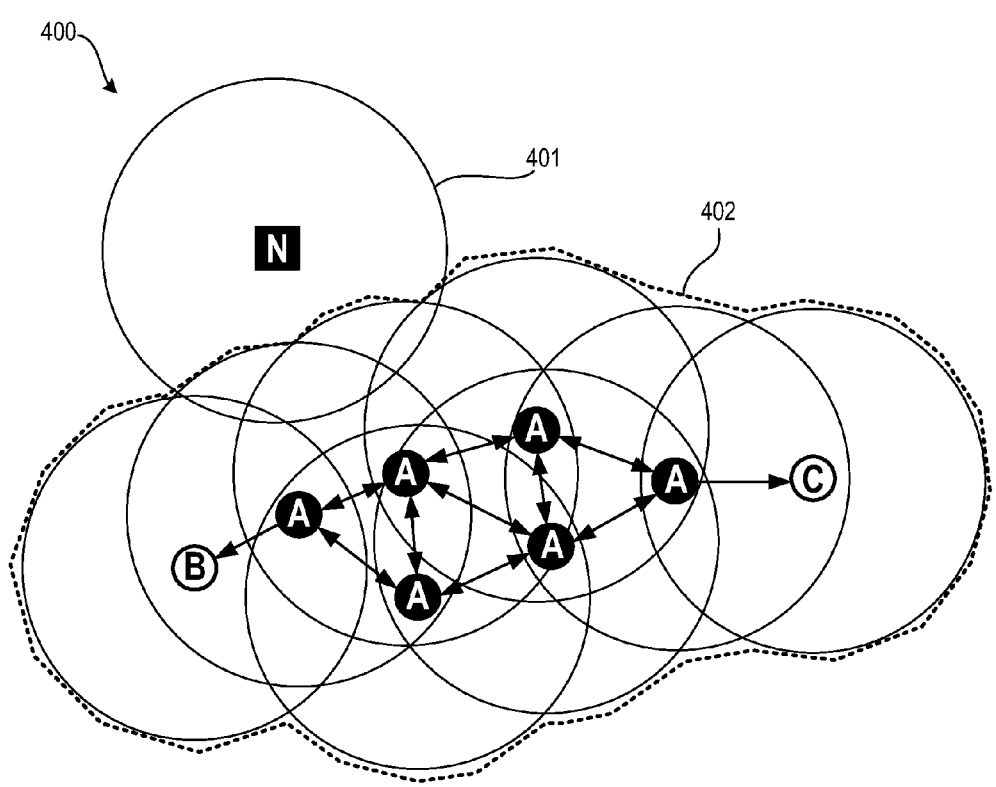
FIG. 4 illustrates a scenario diagram representing location-based data points analyzed with a data clustering algorithm, according to one or more embodiments.

FIG. 4 illustrates a scenario diagram 400 representing data activities of the wireless device 100 (FIG. 1) that create location-based data points for analyzing with a data clustering algorithm. In an exemplary embodiment, density-based spatial clustering of applications with noise (DBSCAN) is a data clustering algorithm based on density of a given set of points in some space. DBSCAN groups together points that are closely packed together, that is, points with many nearby neighbors. DBSCAN also marks points that lie alone in low-density regions as outliers whose nearest neighbors are too far away. DBSCAN requires two parameters: $\epsilon$ (eps) and the minimum number of points required to form a dense region (minPts)

As an example, consider a set of points in some space to be clustered. For the purpose of DBSCAN clustering, the points are classified as core points, (density-) reachable points and outliers, as follows: (a) A point p is a core point if at least minPts points are within distance $\epsilon$ of the p, and those points are said to be directly reachable from p. No points are reachable from a non-core point; (b) A point q is reachable from p if there is a path $p_1, \ldots, p_n$ with $p_1 = p$ and $p_n = q$, where each $p_{i+1}$ is directly reachable from $p_i$ (so all the points on the path must be core points, with the possible exception of q); (c) All points not reachable from any other point are outliers. Now, if p is a core point, then p forms a cluster together with all points (core or non-core) that are reachable from p. Each cluster contains at least one core point. Non-core points can be part of a cluster, but the non-core points form an "edge" of the cluster, since the non-core points cannot be used to reach more points.

In the scenario diagram 400, minPts=4. Point A and the other solid round point ("●") are core points, because at least three points surround it in an ϵ radius, designated as circles 401 around each point. Because the core points are all reachable from one another, they form a single cluster. Points B and C are not core points, but are reachable from A (via other core points) and thus belong to the cluster as well, designated as a hollow point ("○"). Point N is a noise point that is neither a core point nor density-reachable and is designated as solid square points ("■"). A geo-fence 403 can be defined as an outer perimeter that includes each of the points A, B and C but not N.

DBSCAN starts with an arbitrary starting point that has not been visited. This point's ϵ-neighborhood is retrieved, and if the neighborhood contains sufficiently many points, a cluster is started. Otherwise, the point is labeled as noise. Note that this point might later be found in a sufficiently sized ϵ-environment of a different point and hence be made part of a cluster. If a point is found to be in a dense part of a cluster, the ϵ-neighborhood of the point is also part of that cluster. Hence, all points that are found within the ϵ-neighborhood are added, as is their own ϵ-neighborhood when they are also dense. This process continues until the density-connected cluster is completely found. Then, a new unvisited point is retrieved and processed, leading to the discovery of a further cluster or noise.

Figure 5:
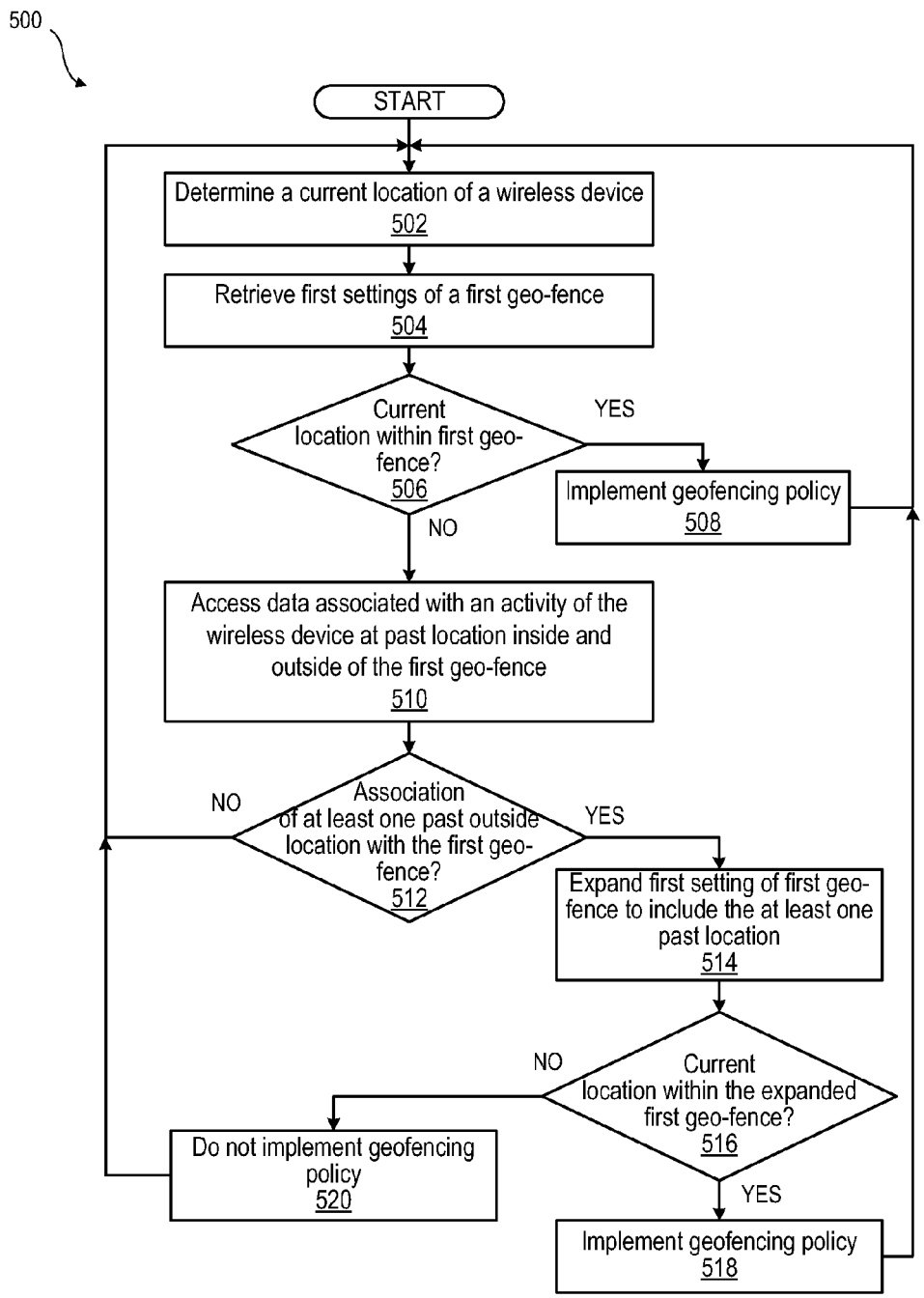
FIG. 5 illustrates a flow chart of method of accurately enforcing a geo-fencing policy for a portable wireless device in a communication system, according to one or more embodiments.
Figure 6:
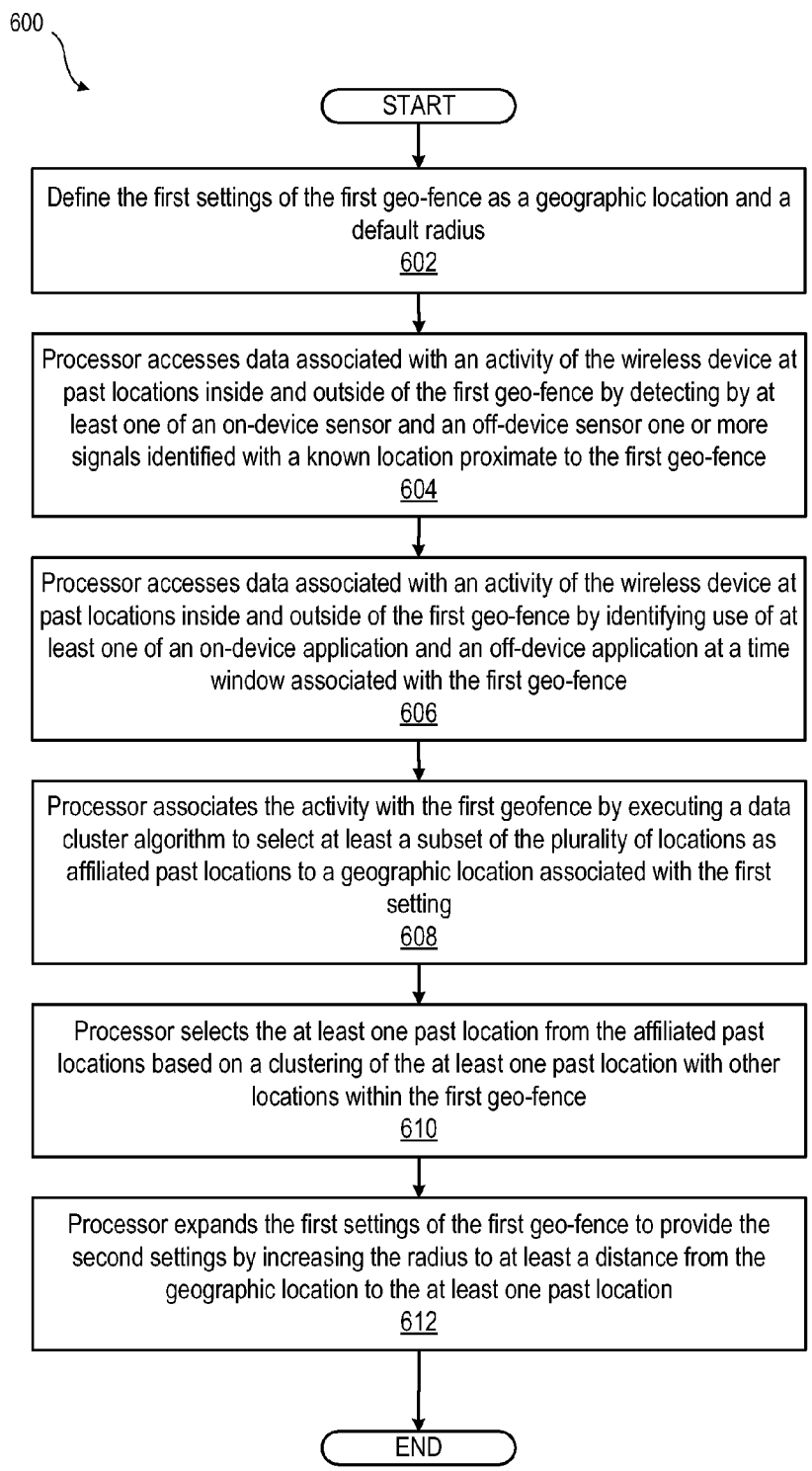
FIG. 6 illustrates a flow chart of method of dynamically defining and implementing a geo-fencing policy based on activities of a portable communication device, according to one or more embodiments.

FIGS. 5-6 illustrate a flowchart of an exemplary method 500 by which processors 120, 222 (FIGS. 1, 2) within the preceding figures performs different aspects of the processes that enable the one or more embodiments of the disclosure. Generally, method 500 represents a computer-implemented method. The description of method 500 is provided with general reference to the specific components illustrated within the preceding FIGS. 1, 2. It is however appreciated that certain aspects of the described methods may be implemented via other processing devices and/or execution of other code.

FIG. 5 illustrate a method 500 of accurately enforcing a geo-fencing policy for a portable wireless device in a communication system. In one or more embodiments, the method 500 includes determining a current location of a wireless device (block 502). The method 500 includes retrieving, from a memory, first settings of a first geo-fence (block 504). The method 500 includes a processor determining whether the determined current location of the wireless device is within the first geo-fence (decision block 506). In one or more embodiments, determining the current location and defining geo-fences can be performed by the wireless device, by a network system that communicates over the communication system to the wireless device, or as a shared operation by both the wireless device and the network system. In response to determining in decision block 506, based on the first settings, that the current location is within the first geo-fence, the method 500 includes the processor implementing a geo-fencing policy (block 508). Then method 500 returns to determining a current location of the wireless device in block 502.

In response to determining in decision block 506, based on the first settings, that the current location is not within the first geo-fence, the method 500 includes the processor accessing data associated with an activity of the wireless device at a past location inside and outside of the first geo-fence (block 510). The method 500 includes the processor determining whether there is an association with the first geo-fence of at least one past location that is outside of the first geo-fence, based on the activity (decision block 512). An exemplary embodiment of performing the association is described below with regard to FIG. 6. With continued reference to FIG. 5, in response to determining in decision block 512 that the at least one past location that is outside of the first geo-fence is associated with the geofence, the method 500 includes the processor expanding the first settings of the first geo-fence to provide second settings that include the at least one past location, such that the geo-fencing policy extends to an expanded first geo-fence (block 514). The method 500 includes the processor determining whether the determined current location of the wireless device is within the expanded first geo-fence (decision block 516). In response to determining in decision block 506, based on the second settings, that the current location is within the expanded first geo-fence, the method 500 includes the processor implementing the geo-fencing policy (block 518). In response to determining in decision block 518, based on the second settings, that the current location is not within the expanded first geo-fence, the method 500 includes the processor not implementing the geo-fencing policy (block 520). Then method 500 returns to determining a current location of the wireless device in block 502.

FIG. 6 illustrates an example method 600 of dynamically defining and implementing a geo-fencing policy based on activities of a portable communication device. In one or more embodiments, the method 600 includes defining the first settings of the first geo-fence as a geographic location and a default radius (block 602). The method 600 includes the processor accessing data associated with an activity of the wireless device at a plurality of locations within and outside of the first geo-fence. In one or more embodiments, the method 600 includes accessing data associated with an activity of the wireless device at past locations inside and outside of the first geo-fence by detecting, via at least one of an on-device sensor and an off-device sensor, one or more signals identified with a known location proximate to the first geo-fence (block 604). In one or more embodiments, the method 600 includes the processor accessing data associated with an activity of the wireless device at past locations inside and outside of the first geo-fence by identifying use of at least one of an on-device application and an off-device application at a time window associated with the first geo-fence (block 606). The method 600 includes the processor associating the activity with the first geo-fence by executing a data cluster algorithm to select at least a subset of the plurality of locations as affiliated past locations to a geographic location associated with the first setting (block 608). In one or more embodiments, the data cluster algorithm is a density-based spatial clustering of application with noise (DBSCAN) algorithm. The method 600 includes the processor selecting the at least one past location from the affiliated past locations based on a clustering of the at least one past location with other locations within the first geo-fence (block 610). The method 600 includes the processor expanding the first settings of the first geo-fence to provide the second settings by increasing the radius to at least a distance from the geographic location to the at least one past location (block 612). Then method 600 ends.

In one or more embodiments, the method 600 includes the processor determining the current location of the wireless device by sensing a relative location to one or more communication nodes. The method 600 includes the processor implementing the geo-fencing policy by disabling a location utility of the device that receives one or more Global Navigation Satellite System (GNSS) signals. The method 600 includes the processor associating with the first geo-fence the at least one past location that is outside of the first geo-fence based on the first settings. In one or more embodiments, the method 600 associates by executing a data cluster algorithm to select a subset of locations inside and outside the first geo-fence as substantially equivalent locations. This association can compensate for inaccuracy in determining the current location using the relative location to one or more communication nodes.

FIG. 7 illustrates an example data structure 700 for activities of a portable wireless device that are identified with particular locations and tracked for later data cluster analysis for changing dimensions of the geo-fence. The activities can be related to different functionalities of the wireless portable device, sensed communication entities surrounding the wireless device, and contextual circumstances of the activities such as time windows. The dimensions of the geo-fence can be determined initially from such data, rather than merely imposing a geographic circle or polygon around certain points. Alternatively or in addition, activity that is tracked in and around a defined geo-fence can dynamically modify its boundaries.

In the above described flow charts of FIGS. 5-6, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   determining a current location of a wireless device;
   retrieving, from a memory, first settings of a first geo-fence, wherein the first settings of the first geo-fence comprise a geographic location and a default radius;
   implementing a geo-fencing policy in response to determining, based on the first settings, that the current location is within the first geo-fence; and
   in response to determining that the current location is not within the first geo-fence:
      accessing data associated with an activity of the wireless device at past locations inside and outside of the first geo-fence;
      associating with the first geo-fence at least one past location that is outside of the first geo-fence, based on the activity;
      expanding the first settings of the first geo-fence to provide second settings that include the at least one past location, such that the geo-fencing policy extends to an expanded first geo-fence, wherein the radius increases to at least a distance from the geographic location to the at least one past location; and
      implementing the geo-fencing policy in response to determining that the current location is within the expanded first geo-fence.

2. The method of claim 1, wherein associating with the first geo-fence at least one past location comprises:
   accessing data associated with the activity of the wireless device at a plurality of locations within and outside of the first geo-fence;

executing a data cluster algorithm to select at least a subset of the plurality of locations as affiliated past locations to a geographic location associated with the first settings; and selecting the at least one past location from the affiliated past locations based on a clustering of the at least one past location with other locations within the first geo-fence.

3. The method of claim 2, wherein executing the data cluster algorithm comprises performing a density-based spatial clustering of application with noise (DBSCAN) algorithm.

4. The method of claim 1, wherein:

determining the current location of the wireless device comprises sensing a relative location to one or more communication nodes;

implementing the geo-fencing policy comprises disabling a location utility of the device that receives one or more Global Navigation Satellite System (GNSS) signals; and associating with the first geo-fence the at least one past location that is outside of the first geo-fence based on the first settings comprises executing a data cluster algorithm to select a subset of locations inside and outside the first geo-fence as substantially equivalent locations to compensate for inaccuracy in determining the current location using the relative location to one or more communication nodes.

5. The method of claim 1, wherein accessing data associated with an activity of the wireless device at past locations inside and outside of the first geo-fence comprises detecting by at least one of an on-device sensor and an off-device sensor one or more signals identified with a known location proximate to the first geo-fence.

6. The method of claim 1, wherein accessing data associated with an activity of the wireless device at past locations inside and outside of the first geo-fence comprises identifying use of at least one of an on-device application and an off-device application at a time window associated with the first geo-fence.

7. A wireless device comprising:

a receiver that detects information corresponding to a current location of the device;

a processor in communication with the receiver; and at least one memory device that contains an application and that is configured to store a set of instructions that are executed by the processor, and wherein:

the processor determines a current location of a wireless device, based in part on the information detected by the receiver;

the processor retrieves, from a memory, first settings of a first geo-fence, wherein the first settings of the first geo-fence comprise a geographic location and a default radius;

the processor implements a geo-fencing policy in response to determining that the current location is within the first geo-fence based on the first settings; and in response to the processor determining, based on the first settings, that the current location is not within the first geo-fence:

the processor accesses data associated with an activity of the wireless device at past locations inside and outside of the first geo-fence from the memory device;

the processor associates at least one past location that is outside of the first geo-fence with the first geo-fence based on the activity;

the processor expands the first settings of the first geo-fence to provide second settings that include the at least one past location such that the geo-fencing policy extends to an expanded first geo-fence, wherein the processor increases the radius to at least a distance from the geographic location to the at least one past location; and the processor implements the geo-fencing policy in response to determining that the current location is within the expanded first geo-fence.

8. The wireless device of claim 7, wherein the processor associating with the first geo-fence at least one past location comprises:

the processor accessing, from the memory device, data associated with the activity of the wireless device at a plurality of locations within and outside of the first geo-fence;

the processor executing a data cluster algorithm to select a subset of the plurality of locations as affiliated past locations to a geographic location associated with the first settings; and the processor selecting the at least one past location based on a clustering of the at least one past location with other locations within the first geo-fence.

9. The wireless device of claim 8, wherein the data cluster algorithm comprises a density-based spatial clustering of application with noise (DBSCAN) algorithm.

10. The wireless device of claim 7, further comprising a location utility that receives one or more Global Navigation Satellite System (GNSS) signals, wherein:

the processor implements the geo-fencing policy by disabling the location utility;

a receiver senses a relative location to one or more communication nodes;

the processor determines the current location of the wireless device based on the relative location; and the processor associates the first geo-fence with the at least one past location that is outside of the first geo-fence based on the first settings by executing a data cluster algorithm to select a subset of locations within and without the first geo-fence as substantially equivalent locations to compensate for inaccuracy in determining the current location using the relative location to one or more communication nodes.

11. A computer program product comprising:

a computer-readable storage device having stored thereon program code that, when executed, configures a device having a processor to perform executable operations comprising:

determining a current location of a wireless device;

retrieving, from a memory, first settings of a first geo-fence, wherein the first settings of the first geo-fence comprise a geographic location and a default radius;

implementing a geo-fencing policy in response to determining based on the first settings, that the current location is within the first geo-fence; and in response to determining that the current location is not within the first geo-fence:

accessing data associated with an activity of the wireless device at past locations inside and outside of the first geo-fence;

associating with the first geo-fence at least one past location that is outside of the first geo-fence based on the activity;

expanding the first settings of the first geo-fence to provide second settings that include the at least one past location such that the geo-fencing policy extends to an expanded first geo-fence, wherein the radius increases to at least a distance from the geographic location to the at least one past location; and implementing the geo-fencing policy in response to determining that the current location is within the expanded first geo-fence.

12. The computer program product of claim 11, wherein the program code for associating with the first geo-fence at least one past location comprises program code for:

accessing data associated with the activity of the wireless device at a plurality of locations within and outside of the first geo-fence;

executing a data cluster algorithm to select at least a subset of the plurality of locations as affiliated past locations to a geographic location associated with the first settings; and selecting the at least one past location based on a clustering of the at least one past location with other locations within the first geo-fence.

13. The computer program product of claim 12, wherein the data cluster algorithm comprises a density-based spatial clustering of application with noise (DBSCAN) algorithm.

14. The computer program product of claim 11, wherein:

the program code for implementing the geo-fencing policy comprises code for disabling a location utility that receives one or more Global Navigation Satellite System (GNSS) signals;

the program code for determining the current location of the wireless device comprises code for sensing a relative location to one or more communication nodes; and the program code for associating with the first geo-fence the at least one past location that is outside of the first geo-fence based on the first settings comprises code for executing a data cluster algorithm to select a subset of locations within and without the first geo-fence as substantially equivalent locations to compensate for inaccuracy in determining the current location using the relative location to one or more communication nodes.

* * * * *